(12) United States Patent
Hauser et al.

(10) Patent No.: US 6,968,684 B1
(45) Date of Patent: Nov. 29, 2005

(54) VALVE FOR A HYDRAULIC DRIVE APPARATUS

(75) Inventors: Raymond Hauser, Sullivan, IL (US); William H. Ward, Mahomet, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 10/732,762

(22) Filed: Dec. 10, 2003

Related U.S. Application Data (63) Continuation-in-part of application No. 10/664,633, filed on Sep. 18, 2003.

(51) Int. Cl.$^7$ .............................................. F16D 31/02
(52) U.S. Cl. ......................................... 60/468; 60/489
(58) Field of Search .......................... 60/459, 468, 489; 180/6.3

(56) References Cited

U.S. PATENT DOCUMENTS

| | | | |
|---|---|---|---|
| 3,522,999 A | | 8/1970 | Liles |
| 4,494,624 A | | 1/1985 | Scheuerle et al. |
| 4,915,126 A | | 4/1990 | Gyllinder |
| 4,948,092 A | | 8/1990 | Kasper et al. |
| 5,282,363 A | * | 2/1994 | Ogawa et al. ................. 60/420 |
| 5,333,451 A | * | 8/1994 | Sakikawa et al. .............. 60/468 |
| 5,412,948 A | | 5/1995 | Komura et al. |
| 5,542,384 A | | 8/1996 | Rosenmann et al. |
| 5,546,752 A | | 8/1996 | Horton et al. |
| 5,632,467 A | | 5/1997 | Just et al. |
| 5,687,468 A | | 11/1997 | Hans |
| 6,045,116 A | | 4/2000 | Willke et al. |
| 6,056,074 A | * | 5/2000 | Heal et al. .................. 180/6.48 |
| 6,073,444 A | | 6/2000 | Horton et al. |
| 6,079,957 A | | 6/2000 | Jirele |
| 6,295,811 B1 | * | 10/2001 | Mangano et al. ............. 60/468 |

OTHER PUBLICATIONS

Circle Seals Controls, Inc., "100 Series Check Valves 0 to 25 PSIG," brochure, Circle Seals Controls, Inc. (Corona, California), p. 1-2.
Circle Seal Controls, Inc., "200 Series 0 to 3,000 PSIG H200 Series 0 to 6,000 PSIG Check Valves," brochure,.
The Lee Company, "Lee Cheks," web site information brochure, (Mar. 15, 2002).
The Lee Company, "Lee Pressure Relief Valves How to select the right Relief Valve for your application," Article, (Mar. 15, 2002).
Kepner Products Company, "Check Valves," web site product information, (Mar. 15, 2002).
Kepner Products Company, "Relief Valves," web site product information, Kepner Products Company,.

* cited by examiner

*Primary Examiner*—Edward K. Look
*Assistant Examiner*—Devin Hanan
(74) *Attorney, Agent, or Firm*—Neal, Gerber & Eisenberg LLP

(57) ABSTRACT

An improved valve for use in a hydrostatic drive apparatus for a vehicle such as a zero turn vehicle. For each hydraulic drive system in the vehicle, a valve is located between the high and low pressure sides of the closed hydraulic circuit connecting the hydraulic pump and motor. The valve opens when the pressure rise rate in the high pressure side reaches a set level to minimize pressure spikes in the high pressure side and thus improve performance of the vehicle. A valve block may be used to mount the valve, and a second valve may also be included therein to connect the two pressure sides of the hydraulic circuit in a similar manner when the vehicle is operated in reverse.

18 Claims, 10 Drawing Sheets

VALVE FOR A HYDRAULIC DRIVE APPARATUS

CROSS-REFERENCE TO RELATED APPLICATION

This application is a continuation-in-part of U.S. application Ser. No. 10/664,633 filed Sep. 18, 2003. This application is incorporated herein by reference in its entirety.

BACKGROUND OF THE INVENTION

This invention relates generally to valves, and more particularly, to a valve used in hydraulic pumps and motors to improve the performance thereof. Some hydraulic drive systems such as those used in vehicles are very efficient and such efficiency can cause design and operation problems. For example, the hydraulic drive system may be efficient to the point where the vehicle jerks as it begins to move, and such motion may cause the front end of the vehicle to briefly leave the ground. Such jerks are undesirable as they can cause operator discomfort and may also cause undesirable pressure shocks within the components of the drive system that can affect the life of its components. A variety of techniques are used to reduce the effects of that efficiency, such as use of bleeds or kidney configurations. However, these techniques create problems of their own, such as loss of efficiency at higher load levels.

SUMMARY OF THE INVENTION

A valve configuration for slowing the pressure rise rate of a hydraulic drive system during initial acceleration is disclosed herein. The disclosed valve configuration resolves the above difficulties and adds flexibility to the placement of valves for a slow pressure rise rate. The use of such valves in a zero turn vehicle to improve performance of a pair of drive systems is also disclosed herein.

Other benefits and objects of this invention are disclosed herein and will be obvious to readers of ordinary skill in the art. The features disclosed herein can be combined to create a unique design; it should be understood, however, that such features are unique in their own right and can be used independently with other transmission, transaxle or vehicle designs, as will be obvious to one of ordinary skill in the art.

DETAILED DESCRIPTION OF THE DRAWINGS

Figure 1:
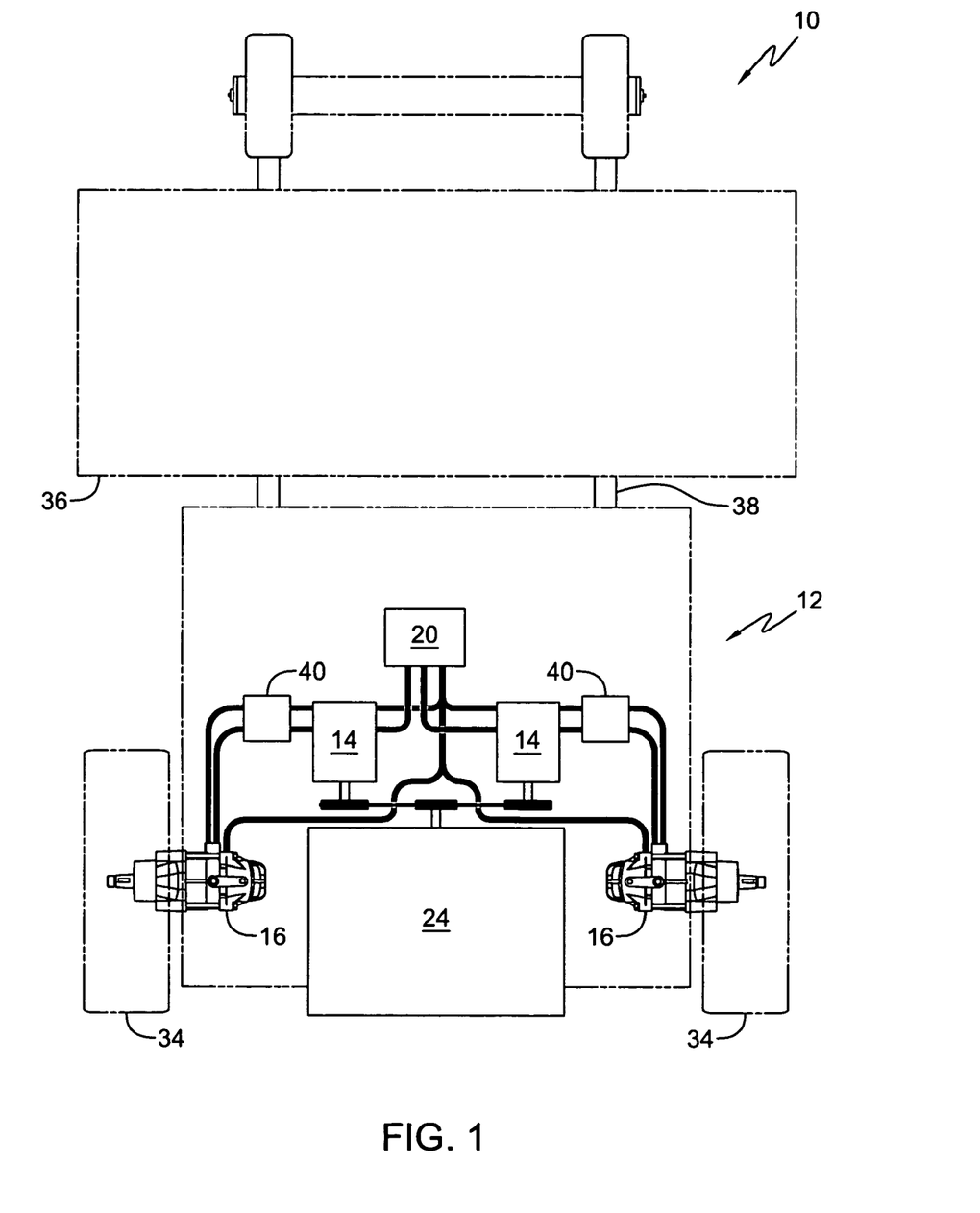
FIG. 1 depicts a plan view of an exemplary vehicle with a first embodiment of a hydraulic drive system incorporating the invention.
Figure 2:
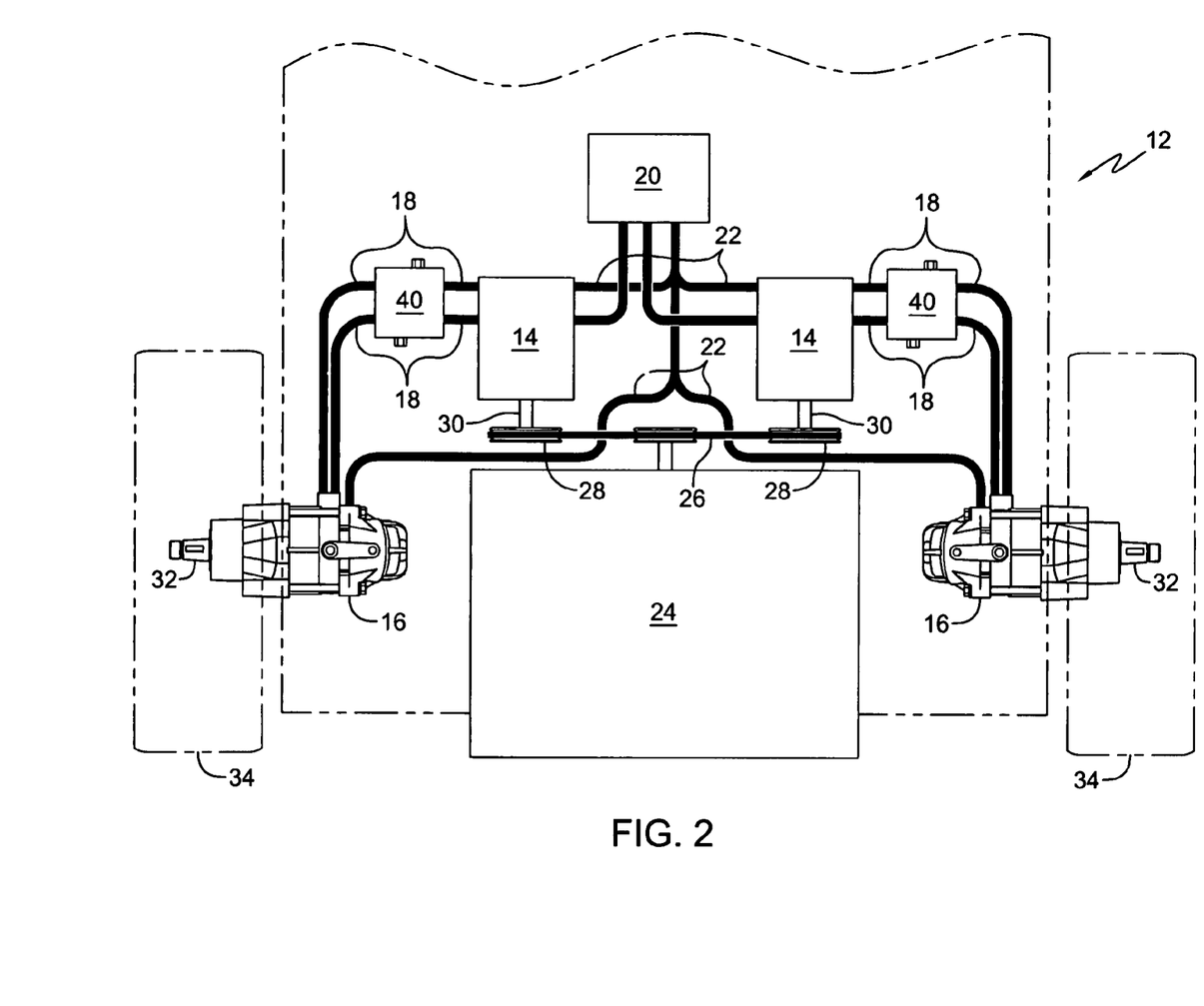
FIG. 2 is a partially schematic plan view of a portion of the exemplary vehicle shown in FIG. 1.

Turning now to the figures, wherein like reference numerals refer to like elements, there is generally illustrated in FIGS. 1 and 2 a vehicle 10 with a hydraulic drive system 12. Drive system 12 comprises a pair of hydraulic pumps 14, which are hydraulically linked to respective hydraulic wheel motors 16 by means of hydraulic lines 18. Pumps 14 obtain hydraulic fluid from a reservoir 20. Pumps 14 and motors 16 may have return lines 22 to return excess hydraulic fluid to reservoir 20 for cooling and filtration prior to being reintroduced to pumps 14.

Pumps 14 are driven by prime mover 24, which may be directly connected to pumps 14 or may be connected via one or more belts 26. Belt 26 is connected to pumps 14 by means of input pulleys 28, which are further connected to input shafts 30, which then drive hydraulic pumps 14. Wheel motors 16 drive output shafts 32, which may also function as axle shafts 32 that then drive wheels 34.

Vehicle 10 may be a variety of configurations such as a zero turn mower or the like, and vehicle 10 may include features such as mowing deck 36 mounted on frame 38. In order to steer such a vehicle, the amount of hydraulic fluid flowing between pumps 14 and motors 16 is independently adjusted to cause one side of vehicle 10 to move faster or slower. The relative speed difference between the right pump 14 and motor 16 and the left pump 14 and motor 16 causes vehicle 10 to be steered. The ability to move the two drive units in opposite directions at the same time provides the unit zero turn capability.

Figure 4:
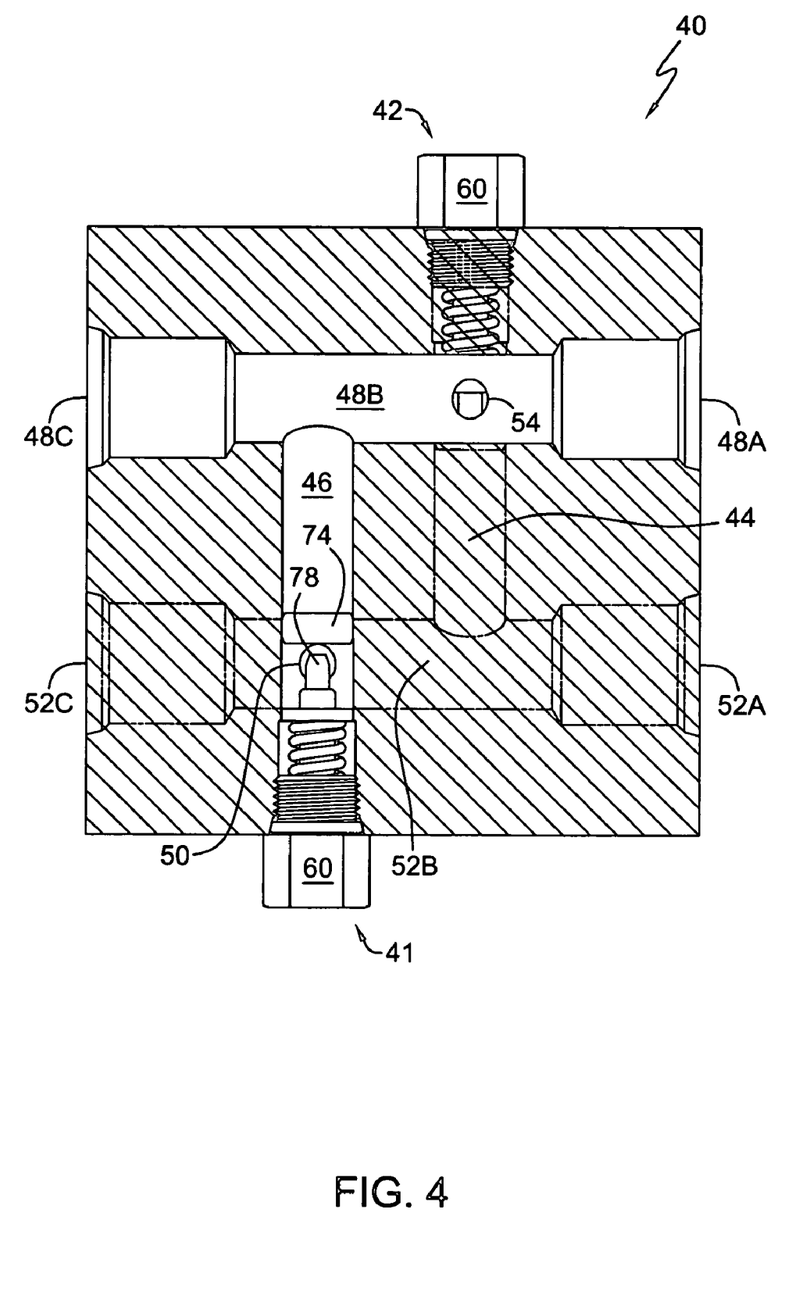
FIG. 4 is a cross-sectional plan view of the valve block shown in FIG. 3 along the lines 4—4.

In order to reduce the efficiency of drive system 12 at initial acceleration, while providing maximum efficiency during travel, a pair of valve blocks 40 are provided. As shown most clearly in FIG. 4, valve block 40 comprises two valves 41 and 42 mounted therein in ports 46 and 44, respectively. In FIG. 4, valve 41 is shown in the open position while valve 42 is shown in the closed position.

Ports 48A and 52A are both connected to pump 14 through hydraulic lines 18. Fluid pressure into port 48A from pump 14 corresponds to fluid flow in the forward direction, while fluid pressure into port 52A corresponds to fluid flow in the reverse direction.

Port 48A connects to port passage 48B, which then connects to port 48C. Additional hydraulic lines 18 are connected to port 48C to connect block 40 to a motor 16. Similarly, port 52A connects to passage 52B, which then connects to port 52C, and then by way of hydraulic lines 18 to motor 16. The hydraulic lines 18 and return lines 22 are all preferably standard rubber hoses or hard plumbing of a type sufficient to withstand the pressures presented by the hydraulic application being used.

When port passage 48B is pressurized, such as would occur during actuation of drive system 12 in the forward direction, port passage 52B in block 40 is in a low pressure condition, which may be vacuum pressure or pressure lower than atmospheric pressure.

A first opening 50 is formed by the intersection of port 46 and passage 52B. A second opening 54 is formed by the intersection of port 44 and passage 48B. Note that openings 50 and 54 are formed by the intersection of two circular passages. There are other techniques for forming a connection between these passages that are known in the art, such as a separate machining to form these openings or casting an interconnecting passage that may open external to valve block 40 and require a separate plug to close the external opening.

Port 46 is formed in block 40 such that it intersects with passage 48B, and a first valve 41 is installed in port 46. Under certain pressure conditions, valve 41 will open such that hydraulic fluid will flow from port passage 48B into port 46, where it will flow into port passage 52B by way of opening 50. The pressure differential between port passage 48B and port passage 52B will cause hydraulic fluid to flow readily from passage 48B to passage 52B when valve 41 is open.

When passage 52B is under high pressure, passage 48B is at a lower pressure, which may be a vacuum pressure or a pressure lower than atmospheric pressure. Valve 42 is positioned in port 44, which intersects port passage 52B. As in the other direction, when valve 42 opens, fluid will flow from port 44 to passage 48B by way of opening 54.

Figure 3:
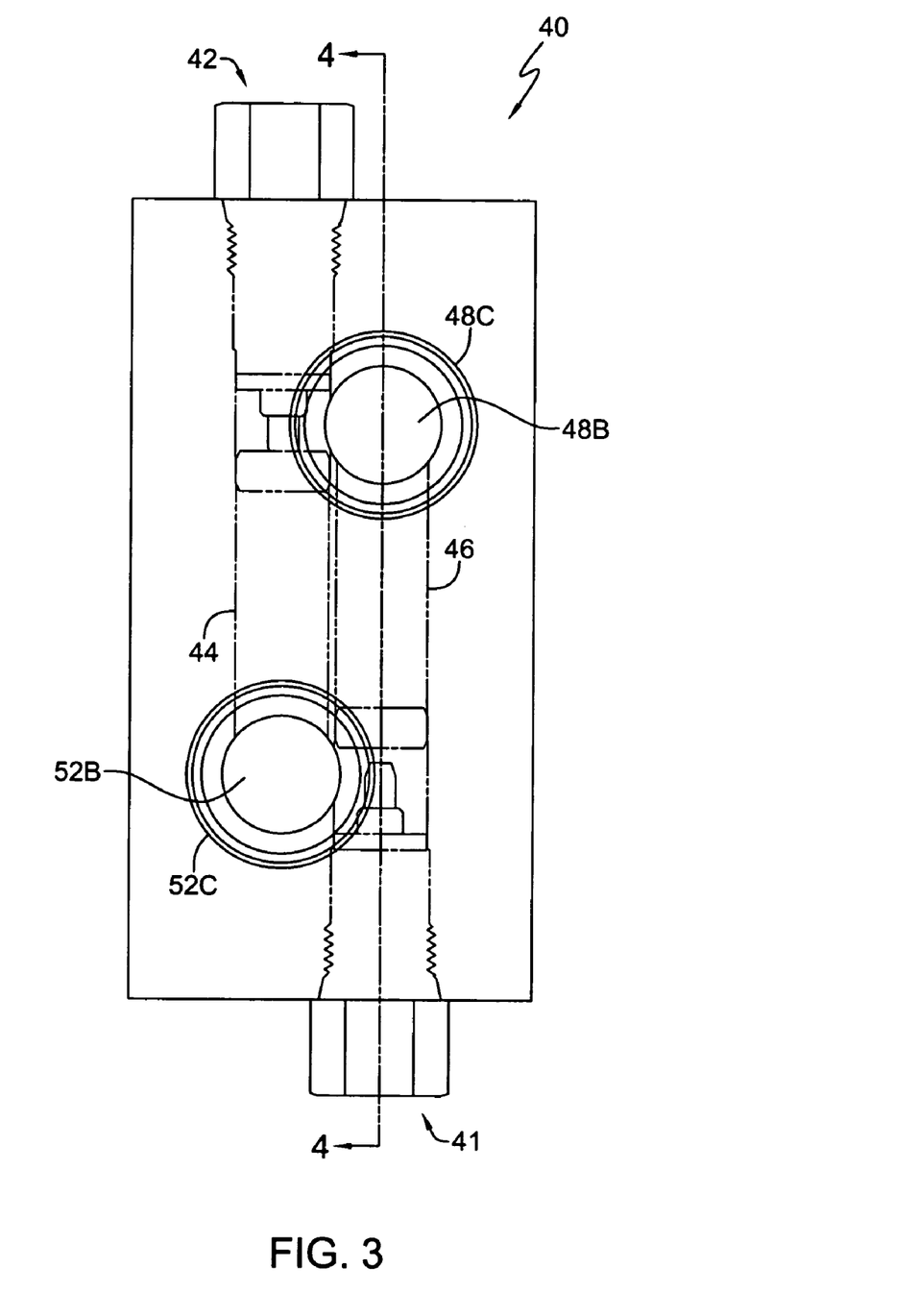
FIG. 3 is a side elevational view of the valve block shown in accordance with the first embodiment of this invention.

As is evident from FIGS. 3 and 4 and from the above description, ports 48A, 48C and 46, passage 48B, and valve 41 have central axes that are generally in a first plane. Ports 52A, 52C and 44, passage 52B and valve 42 have central axes that are generally in a second plane that is different from, though preferably parallel to, the first plane. Such planar separation is required so that flow through passages 48B and 52B is generally unimpeded. As noted previously, while the planes in which these features are located are separated, certain passages are located such that they intersect so as to form connecting passages 50 and 54.

Figure 5:
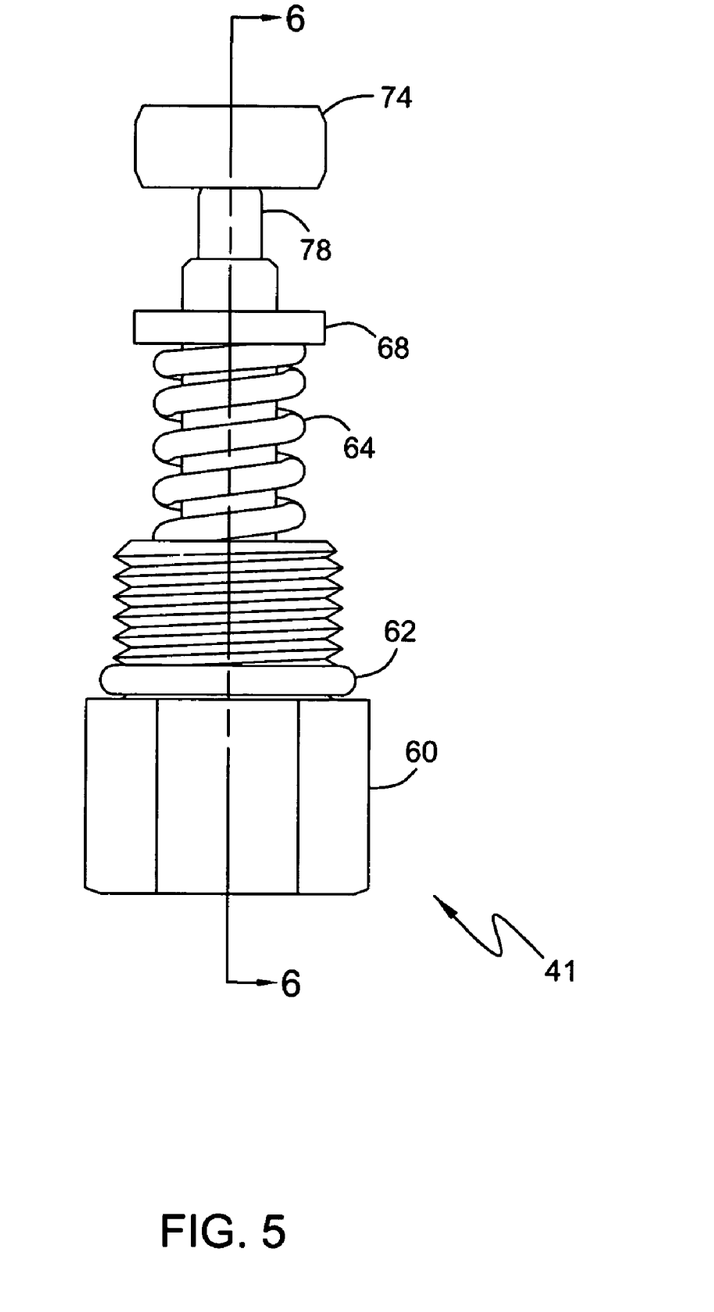
FIG. 5 is an elevational view of one of the valves and the valve seat as shown in FIG. 4.
Figure 6:
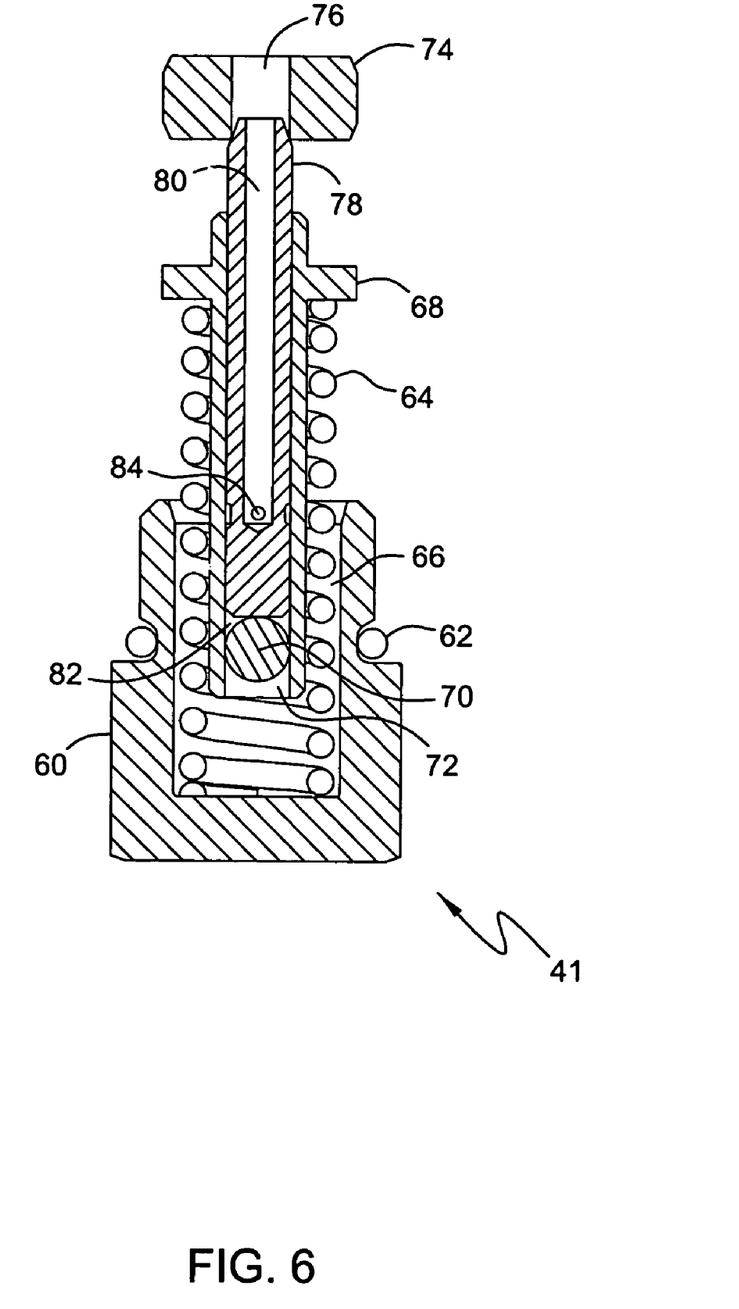
FIG. 6 is a cross-sectional view of the valve and valve seat along lines 6—6 in FIG. 5.

Valve 41, which is preferably identical to valve 42, is shown in more detail in FIGS. 5 and 6, and comprises a valve body 60 which is secured in port 46. O-ring 62 prevents leakage of oil from the interface between valve 41 and block 40. Spring 64 is mounted in bore 66 of valve body 60, and engages outer plunger cylinder 68. A center piston 78, which has an inner bore 80, is mounted in inner bore 72 of outer cylinder 68. Ball 70 is pressed into inner bore 72 at one end thereof.

A separate seat 74, which is also depicted in FIGS. 4 and 5, is pressed into hydraulic port 46 to a measured depth, or to a stop formed therein, and includes an opening 76 formed therein. Seat 74 could also be integrally formed with block 40. Ball 70 could be replaced by other shapes or a functionally equivalent feature could be integrally formed in outer cylinder 68.

Valve 41 is shown in the closed position in FIGS. 5 and 6. As the oil pressure outside seat 74 increases, oil will flow through seat opening 76 into bore 80 of piston 78. The force of piston 78 against ball 70 will move cylinder 68 in a direction away from seat 74, thus compressing spring 64 and opening valve 41 to permit high pressure oil to pass into opening 50 as previously described. Oil will also pass through bleed orifice 84 to area 82 adjacent to ball 70 inside bore 72. As the oil pressure in area 82 increases, it increases pressure on piston 78, forcing piston 78 to move axially away from ball 70 to the point where it again engages seat 74 and closes valve 41.

The rate at which valve 41 opens and closes may be set by design choices such as the spring constant of spring 64 and the diameters of inner bore 80 and bleed orifice 84. Therefore, when the pressure in passage 48B is sufficiently high, such as at engagement of the drive system and initial vehicle movement when the pressure would spike, valve 41 acts to relieve or dampen this pressure spike and improve the ride and performance of the vehicle. Similarly, valve 42 acts in the same manner when pump 14 is put into reverse to dampen any pressure spike in port passage 52B. In the embodiment shown in FIG. 2, both blocks 40 would operate in the same manner to provide damping for both pumps 14.

In some vehicle designs, only the forward or reverse direction may need the pressure rise rate controlled; in such a case either valve port 44 or valve port 46 may be eliminated and valve block 40 would include only a single valve.

Figure 7:
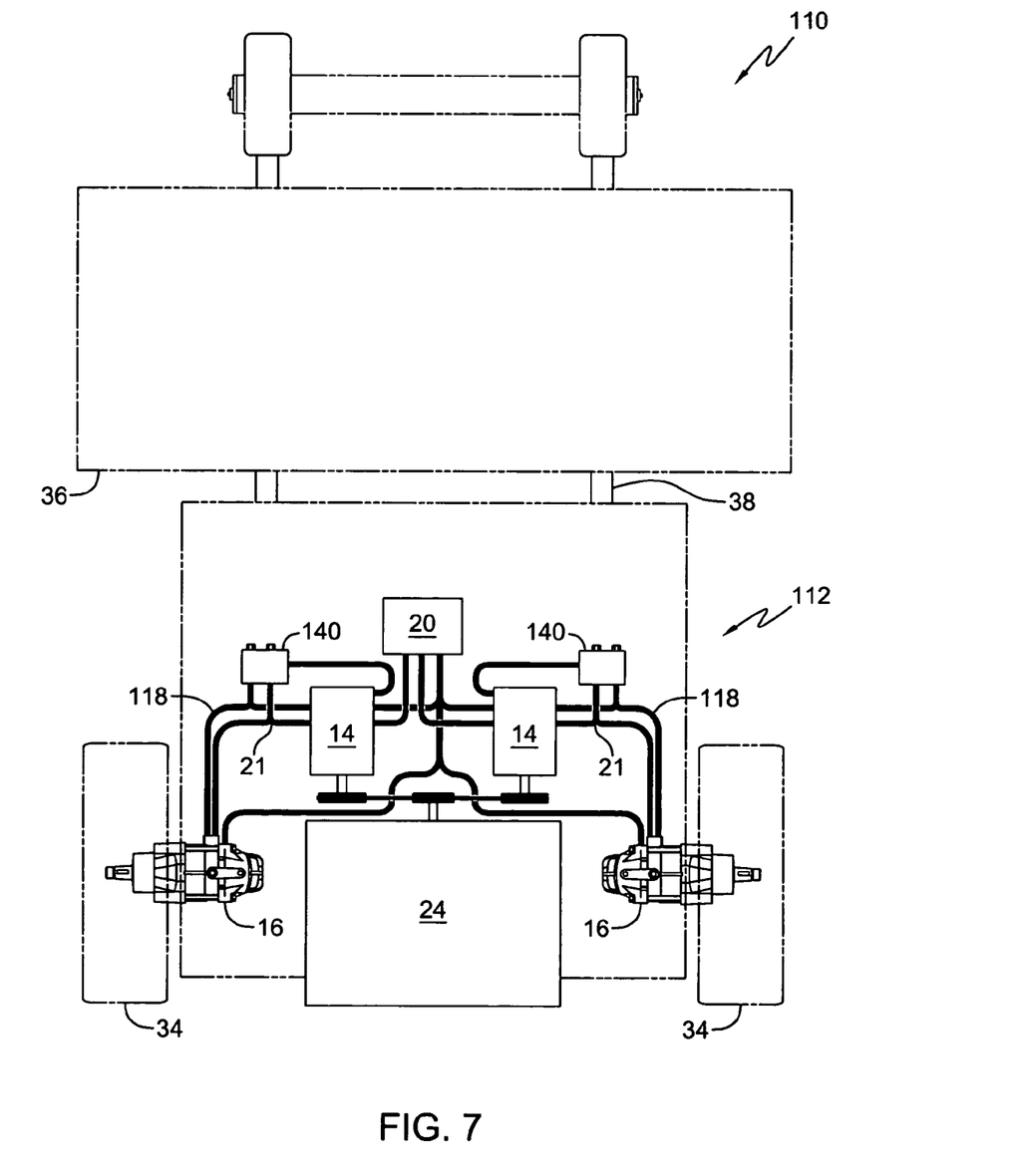
FIG. 7 depicts a plan view of an exemplary vehicle with a second embodiment of a hydraulic drive system incorporating the invention.

A second embodiment of this invention is shown in FIGS. 7–10; in this embodiment certain features are identical to those previously described herein and are given identical numerals. As shown in FIG. 7, hydraulic drive system 112 includes valve blocks 140 which are not in line between pump 14 and motor 16 but rather are offset and are connected to the main lines 118 through tee fittings 21. This configuration allows for a less complex design for valve block 140, resulting in less machining required and consequently lower cost. Allowing valve block 140 to be offset from pump 14 and motor 16 enables the user to mount valve block 140 in a wide range of locations in vehicle 110.

Figure 10:
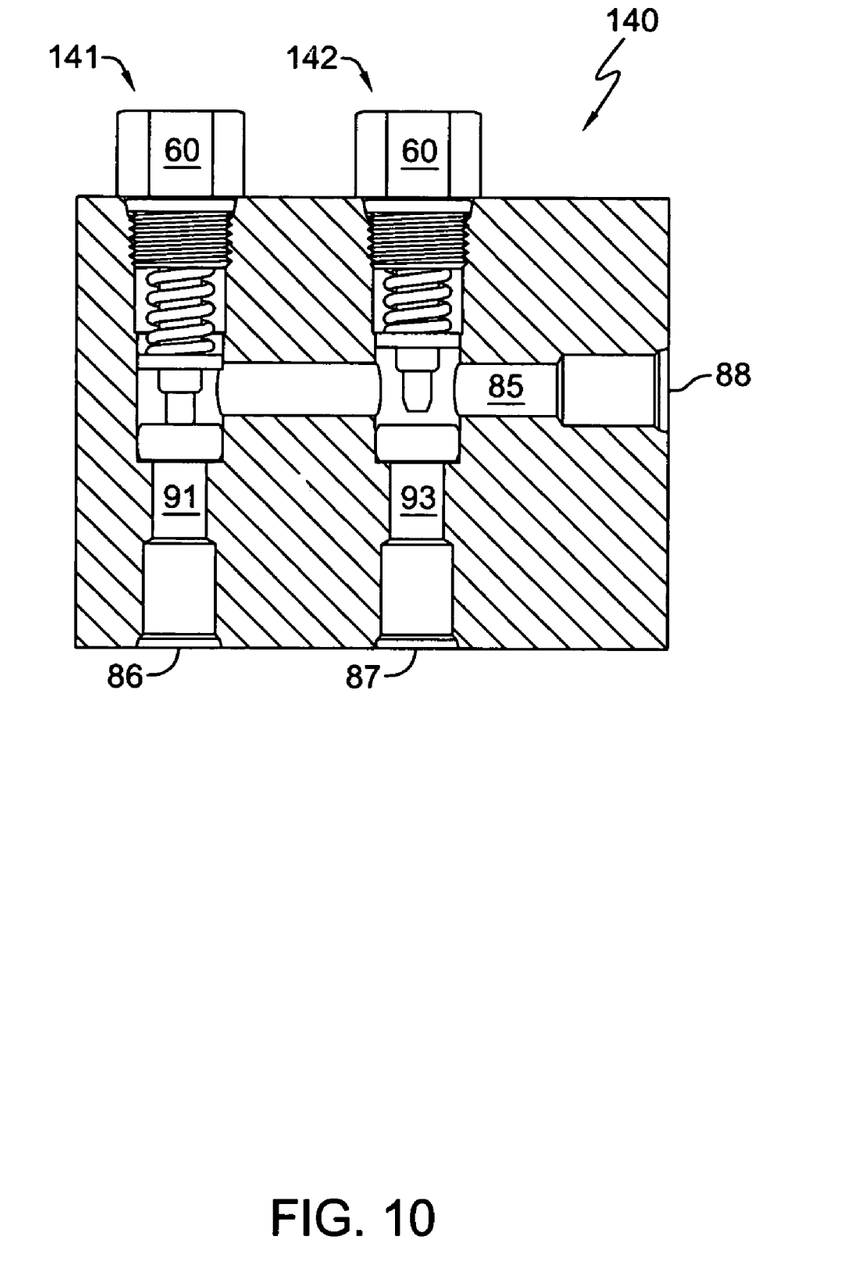
FIG. 10 is a cross-sectional plan view of the valve block shown in FIG. 9 along the lines 10—10.

A cross-sectional view of block 140 is shown in FIG. 10. Valves 141 and 142 can be identical in construction to valves 41 and 42 discussed previously. Block 140 comprises two inlets 86 and 87 connected to separate ports 91 and 93, respectively. A single outlet 88 is connected to an outlet port 85 which intersects both inlet ports 91 and 93. As before, one of the inlet ports is connected to each of the pump main lines 118 through tee fittings 21, so each one corresponds to either the forward or the reverse side of the hydraulic circuit. In FIG. 10, valve 141 is shown as closed and valve 142 is shown in the open position, such that hydraulic fluid can be diverted from the hoses 118 to outlet 88.

Figure 8:
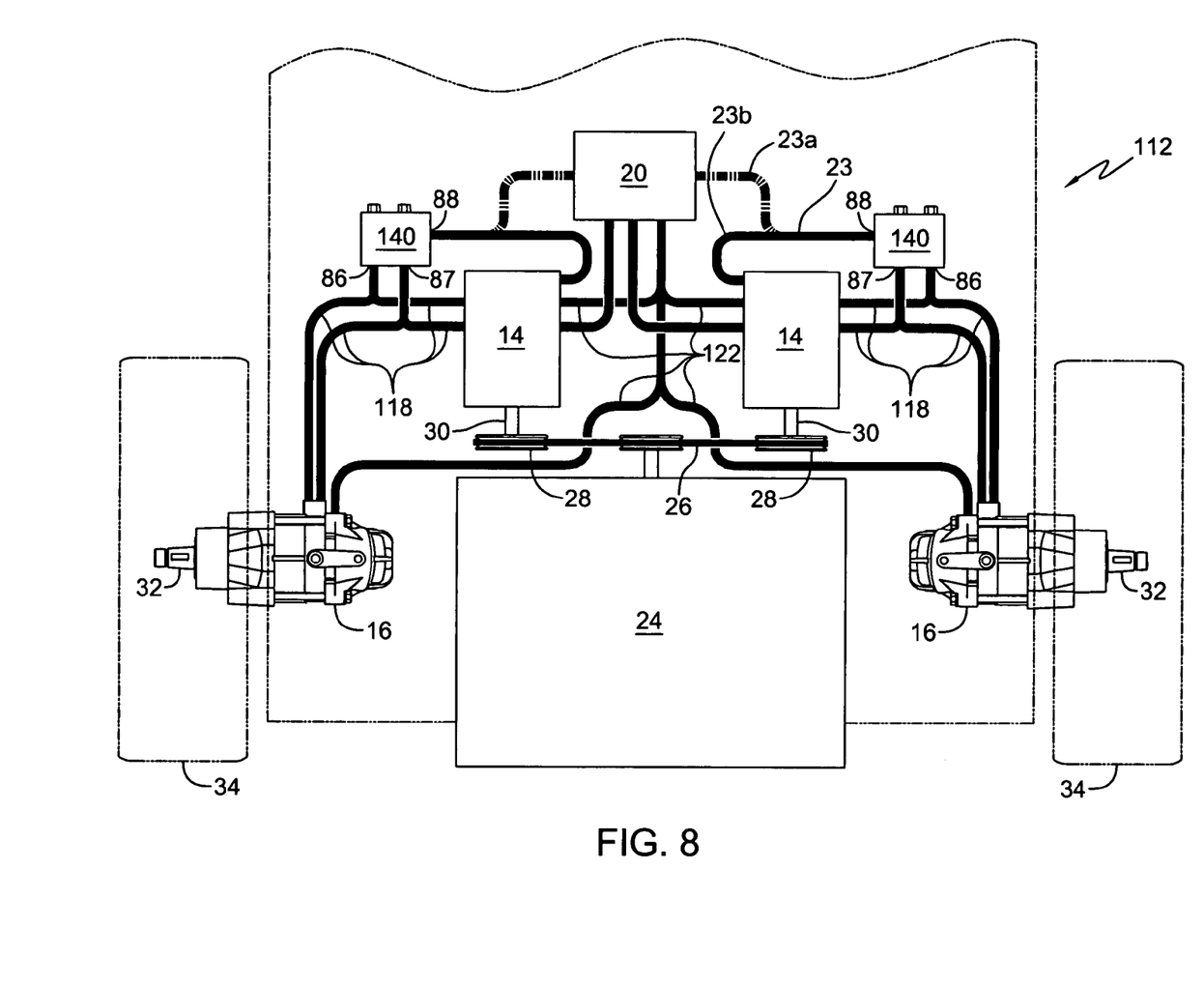
FIG. 8 is a partially schematic plan view of a portion of the vehicle shown in FIG. 7, with optional porting depicted.
Figure 9:
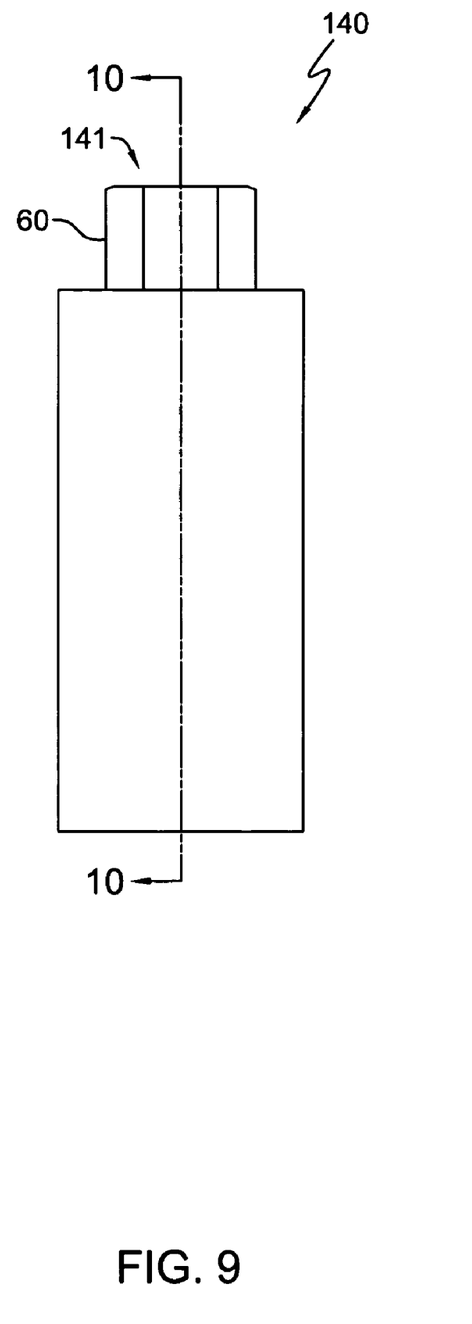
FIG. 9 is a side elevational view of a valve block in accordance with a second embodiment of this invention.

FIG. 8 shows two alternative connections of outlet hose 23; it can extend from outlet 88 through hose 23b where it will go to the charge gallery of each pump 14. As an alternative, the system could be setup so that hydraulic fluid returns through hose 23a to reservoir 20. This option can be given to the person assembling the unit, and the choice of outlet flow paths will depend on factors such as the size of the charge pump (not shown) used with pump 14. If the charge pump is large enough, the fluid can be sent to reservoir 14 for additional cooling. A smaller charge pump may require fluid to be returned to the charge gallery.

While specific embodiments of the invention have been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalents thereof.

What is claimed is:

1. A valve block for use in connection with a hydraulic pump and a hydraulic motor, comprising:

a first port formed in the valve block and having a first opening formed in a first side of the valve block and a second opening formed in a second side of the valve block opposite to the first side;

a second port formed in the valve block and having a third opening formed in the first side of the valve block and a fourth opening formed in the second side of the valve block;

a third port formed in the valve block and having a fifth opening formed in a third side of the valve block, where the third side is perpendicular to the first and second sides, and wherein the third port comprises a bore extending from the fifth opening, and the third port is perpendicular to and intersects both the first and second ports and extends entirely through at least one of the first and second ports;

a first valve mounted in the first opening of the valve block and connecting the first port to the third port;

a second valve mounted in the third opening of the valve block and connecting the second port to the third port;

a first hydraulic line connected between the hydraulic pump and the hydraulic motor and comprising a first connection member between the first hydraulic line and the second opening of the first port;

a second hydraulic line connected between the hydraulic pump and the hydraulic motor and comprising a second connection member between the second hydraulic line and the fourth opening of the second port; and a third hydraulic line extending from the fifth opening of the valve block.

2. A valve block as set forth in claim 1, wherein the first and second ports are parallel.

3. A valve block as set forth in claim 1, wherein the third hydraulic line connects the valve block to an inlet to the hydraulic pump.

4. A valve block as set forth in claim 1, wherein the third hydraulic line connects the valve block to a separate fluid sump.

5. A hydraulic drive apparatus for use in a vehicle, comprising:

a first hydraulic pump housing mounted on the vehicle and having a first hydraulic pump mounted therein:

a first hydraulic motor housing mounted on the vehicle and having a first hydraulic motor mounted therein, wherein the first hydraulic motor is connected to the first hydraulic pump by means of first and second hydraulic lines located external to both the first hydraulic pump housing and the first hydraulic motor housing;

a first valve block mounted on the vehicle at a distance from both the first hydraulic pump housing and the first hydraulic motor housing, the first valve block comprising a first port connected to the first hydraulic line by means of a first connection member, a second port connected to the second hydraulic line by means of a second connection member and a third port having a third hydraulic line extending therefrom, wherein the third port intersects both the first and second ports and extends entirely through at least one of the first and second ports;

a first valve mounted in the valve block and connecting the first port to the third port; and a second valve mounted in the valve block and connecting the second port to the third port.

6. A hydraulic drive apparatus as set forth in claim 5, wherein the third hydraulic line is connected to an inlet of the first hydraulic pump.

7. A hydraulic drive apparatus as set forth in claim 5, wherein the third hydraulic line is connected to a separate fluid sump.

8. A hydraulic drive apparatus as set forth in claim 4, further comprising:

a second hydraulic pump housing mounted on the vehicle and having a second hydraulic pump mounted therein;

a second hydraulic motor housing mounted on the vehicle and having a second hydraulic motor mounted therein, wherein the second hydraulic motor is connected to the second hydraulic pump by means of third and fourth hydraulic lines located external to both the second hydraulic pump housing and the second hydraulic motor housing;

a second valve block mounted on the vehicle at a distance from both the second hydraulic pump and the second hydraulic motor, the second valve block comprising a fourth port connected to the third hydraulic line by means of a third connection member, a fifth port connected to the fourth hydraulic line by means of a fourth connection member and a sixth port having a sixth hydraulic line extending therefrom, wherein the third port intersects both the first and second ports and extends entirely trough at least one of the first and second ports;

a third valve mounted in the second valve block and connecting the fourth port to the sixth port; and a fourth valve mounted in the second valve block and connecting the fifth port to the sixth port.

9. A hydraulic drive apparatus as set forth in claim 8, wherein the sixth hydraulic line is connected to an inlet of the second hydraulic pump.

10. A hydraulic drive apparatus as set forth in claim 8, wherein the sixth hydraulic line is connected to a separate fluid sump.

11. A hydraulic drive apparatus comprising:

a hydraulic pump located in a pump housing and a hydraulic motor mounted in a motor housing separate from the pump housing;

a valve block comprising:

a first port passage extending through the valve block and having a first opening formed in a first side of the valve block and a second opening formed in a second side of the valve block opposite to the first side;

a second port passage extending through the valve block and having a third opening in the first side and a fourth opening in the second side;

a first valve port formed in the valve block and having a fifth opening formed in a third side of the valve block that is perpendicular to the first and second sides;

a second valve port formed in the valve block and having a sixth opening formed in a fourth side of the valve block, wherein the first and second valve ports are each hydraulically connected to both the first and second port passages; and a first valve mounted in the fifth opening of the valve block for controlling the connection between the first and second port passages and a second valve mounted in the sixth opening of the valve block for controlling the connection between the first and second port passages;

wherein the central axis of the first port passage lies in a first plane that is perpendicular to both the first and third sides of the valve block and the central axis of the second port passage lies in a second plane that is perpendicular to both the first and third sides of the valve block and different from the first plane;

a first set of hydraulic lines connected between the hydraulic pump and the first and third openings in the valve block; and a second set of hydraulic lines connected between the hydraulic motor and the second and fourth openings in the valve block.

12. The hydraulic drive apparatus of claim 11, wherein the first valve port lies in the first plane and the second valve port lies in the second plane.

13. The hydraulic drive apparatus of claim 11, wherein the first valve is responsive to the pressure rise rate in the hydraulic line connected between the hydraulic pump and the first opening in the valve block and the second valve is responsive to the pressure rise rate in the hydraulic line connected between the hydraulic pump and the third opening in the valve block.

14. A valve block for use in connection with transferring hydraulic fluid between a hydraulic pump and a hydraulic motor, the valve block comprising:
   a first side and a second side formed opposite thereto, and a third side and a fourth side formed opposite to the third side, where the third and fourth sides are perpendicular to the first and second sides;
   a first set of openings formed in the first side of the valve block for hydraulically connecting the valve block to the hydraulic pump;
   a second set of openings formed in the second side of the valve block for hydraulically connecting the valve block to the hydraulic motor;
   a first port passage formed in the valve block and connecting one of the first set of openings to one of the second set of openings;
   a second port passage formed in the valve block and connecting the other of the first set of openings to the other of the second set of openings;
   a first valve port formed in the third side of the valve block and a second valve port formed in the fourth side of the valve block, wherein the first and second valve ports are each hydraulically connected to both the first and second port passages, and wherein the first valve port does not extend to the fourth side of the valve block and the second valve port does not extend to the third side of the valve block;
   a first valve mounted in the first valve port, wherein the first valve is closed during normal operation and opens when the pressure in the first port passage reaches a selected level to permit hydraulic fluid to bypass from the first port passage to the second port passage; and
   a second valve mounted in the second valve port, wherein the second valve is closed during normal operation and opens when the pressure in the second port passage reaches a selected level to permit hydraulic fluid to bypass from the second port passage to the first port passage.

15. A valve block as set forth in claim 14, wherein the first and second port passages are parallel to one another.

16. A valve block as set forth in claim 15, wherein the first and second valve ports are parallel to one another and perpendicular to the first and second port passages.

17. A vehicle comprising:
   a hydraulic pump and a hydraulic motor mounted on the vehicle; and
   a valve block mounted on the vehicle separate from the hydraulic pump and hydraulic motor, the valve block comprising:
      a fist side and a second side formed opposite thereto, and a third side and a fourth side formed opposite to the third side, where the third and fourth sides are perpendicular to the first and second sides;
      a first set of openings formed in the first side side of the valve block for hydraulically connecting the valve block to the hydraulic pump and a second set of openings formed in the second side of the valve block for hydraulically connecting the valve block to the hydraulic motor;
      a first port passage formed in the third side of the valve block and connecting one of the first set of openings to one of the second set of openings;
      a second port passage formed the fourth side of in the valve block and connecting the other of the first set of openings to the other of the second set of openings; wherein the central axis of the first port passage lies in a first plane that is perpendicular to both the first and third sides of the valve block and the central axis of the second port passage lies in a second plane that is perpendicular to both the first and third sides of the valve block and different from the first plane;
      first and second valve ports formed in the valve block, wherein the first and second valve ports are each hydraulically connected to both the first and second port passages; and
      first and second valves each mounted in one of the valve ports, wherein both valves are closed during normal operation of the hydraulic pump and motor, and wherein the first valve opens when the pressure in the first port passage reaches a selected level to permit hydraulic fluid to bypass from the first port passage to the second port passage and the second valve opens when the pressure in the second port passage reaches a selected level to permit hydraulic fluid to bypass from the second port passage to the first port passage.

18. The vehicle of claim 17, wherein the first and second valve ports are parallel to one another and perpendicular to the first and second port passages.

* * * * *

UNITED STATES PATENT AND TRADEMARK OFFICE
CERTIFICATE OF CORRECTION

PATENT NO. : 6,968,684 B1
DATED : November 29, 2005
INVENTOR(S) : Raymond Hauser and William H. Ward It is certified that error appears in the above-identified patent and that said Letters Patent is hereby corrected as shown below:

Column 5,
Line 57, replace "4" with -- 5 --.

Column 6,
Line 10, replace "trough" with -- through --.

Column 8,
Line 7, replace "fist" with -- first --;
Line 11, replace "side side" with -- side --.

Signed and Sealed this

Sixth Day of June, 2006

JON W. DUDAS
*Director of the United States Patent and Trademark Office*